June 19, 1945. F. H. McCORMICK 2,378,421
DOMESTIC APPLIANCE
Filed Aug. 30, 1941 6 Sheets-Sheet 1

INVENTOR.
Francis H. McCormick
BY

June 19, 1945.  F. H. McCORMICK  2,378,421
DOMESTIC APPLIANCE
Filed Aug. 30, 1941  6 Sheets-Sheet 2

INVENTOR.
Francis H. McCormick

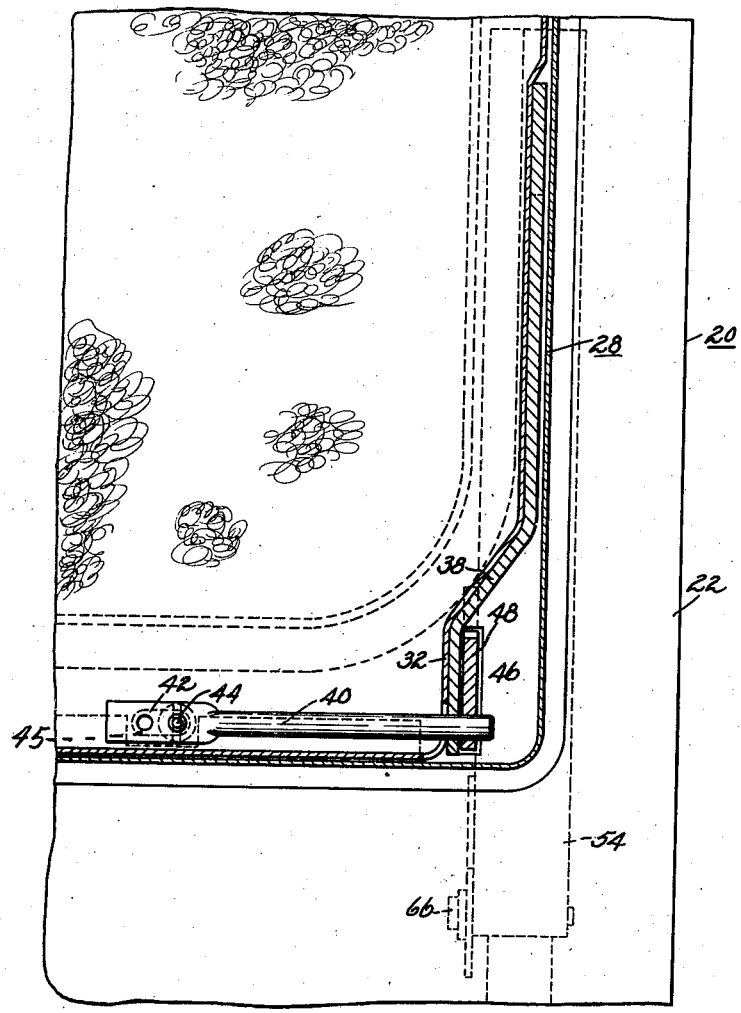
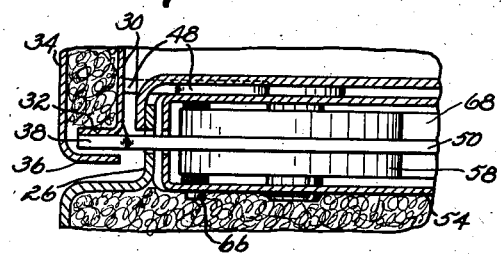

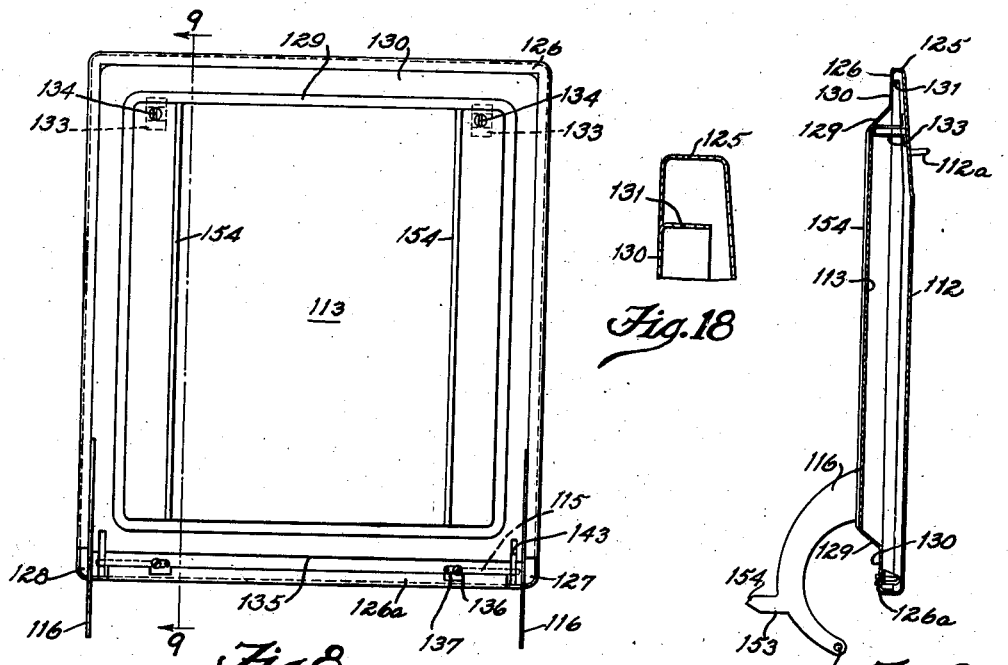
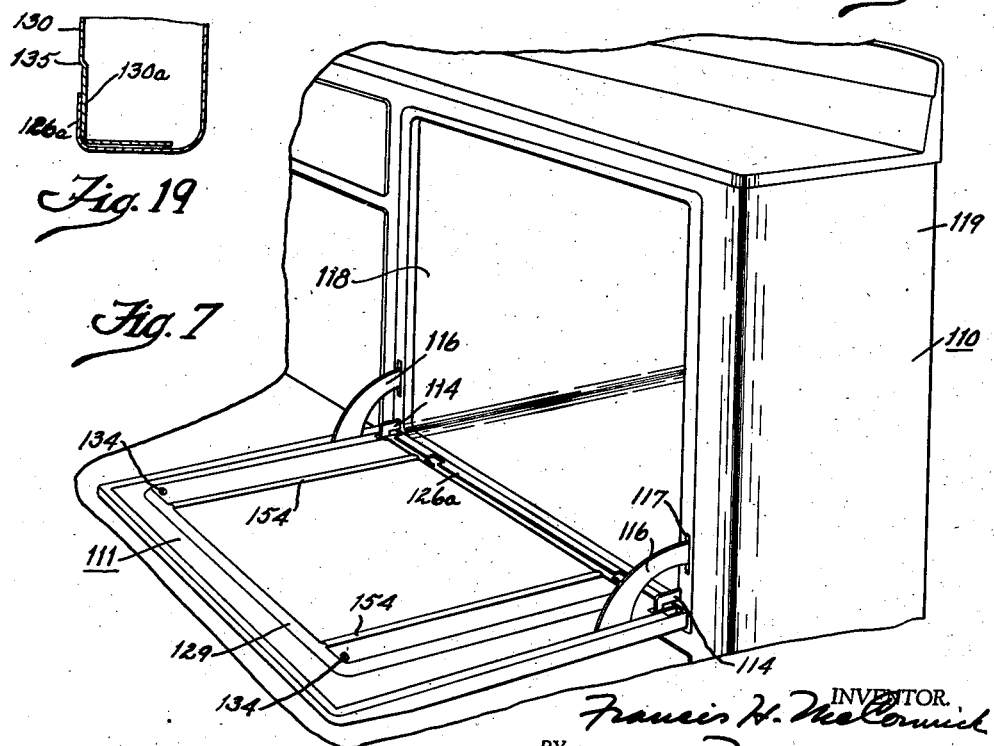

June 19, 1945.   F. H. McCORMICK   2,378,421
DOMESTIC APPLIANCE
Filed Aug. 30, 1941   6 Sheets-Sheet 5

Francis H. McCormick INVENTOR.

Patented June 19, 1945

2,378,421

UNITED STATES PATENT OFFICE 2,378,421

DOMESTIC APPLIANCE

Francis H. McCormick, Oakwood, Ohio, assignor to General Motors Corporation, Dayton, Ohio, a corporation of Delaware Application August 30, 1941, Serial No. 409,077

7 Claims. (126—190)

This invention relates to domestic appliances and more particularly to oven doors and their supports.

This application is a continuation in part of my copending application S. N. 248,823, filed December 31, 1938, for Domestic appliance, now Patent No. 2,308,768, granted January 19, 1943.

An object of this invention is to provide a door construction which may be readily assembled and which is provided with smooth finished surfaces, and presents a pleasing appearance.

Another object of this invention is to provide a simplified form of support and counterbalance for a door.

Further objects and advantages of the present invention will be apparent from the following description, reference being had to the accompanying drawings, wherein a preferred form of the present invention is clearly shown.

In the drawings:

Fig. 5 is a sectional view taken along the line 5—5 of Fig. 2;

Fig. 6 is a sectional view taken along the line 6—6 of Fig. 3;

Fig. 7 is a view in perspective showing an oven with an opened door of a slightly modified form;

Fig. 8 is a rear plan view of the modified form of door;

Fig. 9 is a cross-section taken along the line 9—9 of Fig. 8;

Fig. 18 is an enlarged portion of Fig. 9; and

Fig. 19 is another enlarged portion of Fig. 9.

Briefly, I have shown an electric range provided with a balancing spring door catch and hinge pin bearing in the form of a unitary assembly which may be assembled into the range as a unit prior to the attachment of the door and the lining of the oven. This assembly is fastened by screws to the door jamb portion of the shell so that all the parts cooperating with the door are thereby maintained in proper alignment and relationship. The connection between the door and its control, as well as the adjustment of the control, are both readily accessible from the drawer compartment beneath the oven.

Figure 2:
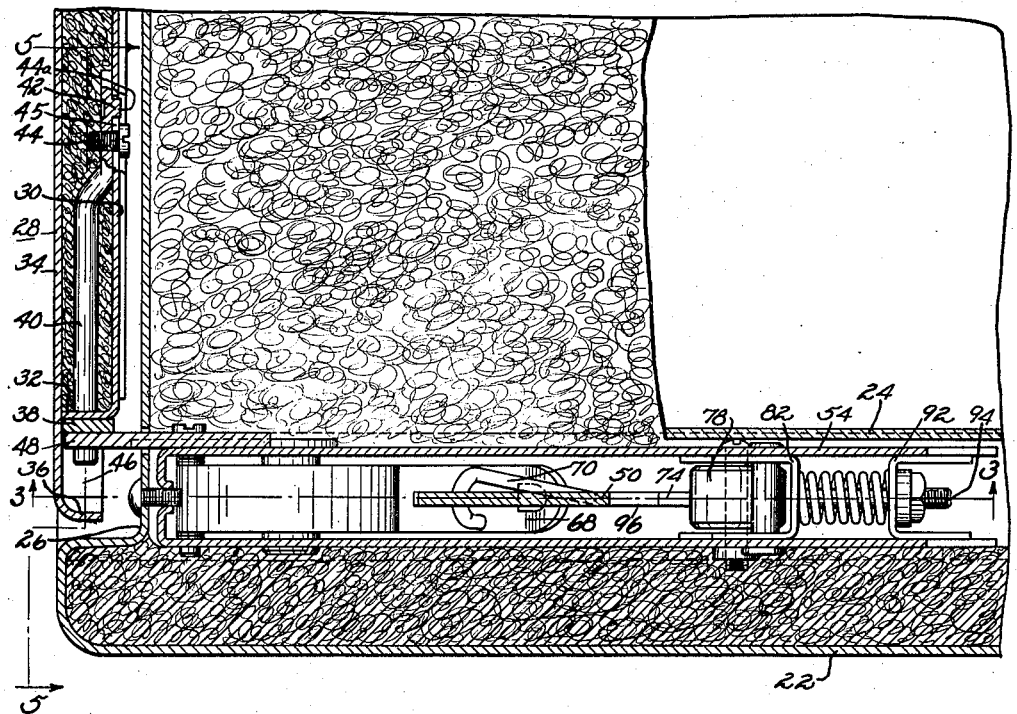
Fig. 2 is a fragmentary sectional view of one front corner portion of the oven including a portion of the door taken along the line 2—2 of Fig. 3.
Figure 1:
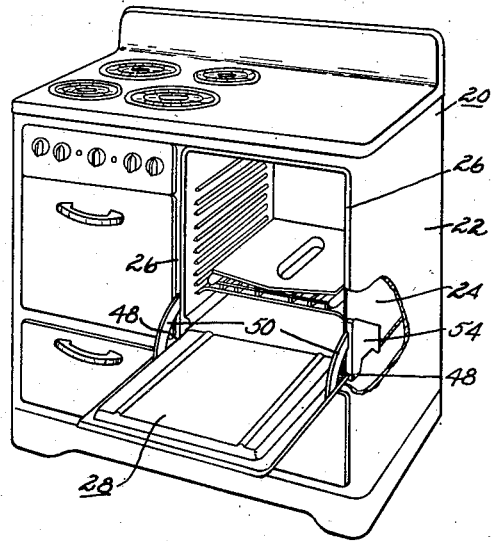
Fig. 1 is a perspective view of an electric range embodying my invention.

Referring now to the drawings, and more particularly to Fig. 1, there is shown an electric range generally designated by the reference character 20 provided with an outer shell 22 containing an oven compartment lined by the oven liner 24. The outer shell 22 is provided with an opening registering with the oven liner 24 and is provided with a recessed flange 26 around the opening which serves as the door jamb for the oven door 28. The flanged recess 26 is sufficiently deep to substantially entirely receive the oven door 28 so as to make the front face of the oven door substantially flush with the other portions of the shell 22. The door 28 is provided with an inner sheet metal member 30 having its edges 32 flanged forwardly, while an outer sheet metal member 34 has its edges 36 flanged in the opposite direction from the flanged edges 32 and overlapping the flanged edges 32. On either side of the door between the flanged edges 32 and 36, there is inserted a heavy metal hinge bracket 38 which is welded or otherwise bonded to the flanged edge 32. This hinge bracket 38 has a portion which extends along the flanged edge of the inner sheet metal member 32 to the bottom of the door. This portion of the bracket 38 is provided with an aperture adjacent the bottom of the door for supporting the hinge pin 40, which is provided with a flattened portion 42 at its inner end fastened to the inner face of the door by the screw 44. The sheet metal member 30 is slotted at 45 to allow the hinge pin 40 to slide longitudinally when the screw 44 is loosened. The flattened portion 42 has struck therein a knob 44a which locks the pin 40 against longitudinal retracting movement when the screw 44 is tightened. The flanged edge of the sheet metal inner member 32 along with the adjacent portion of the hinge bracket 38 is recessed inwardly from the substantially rectangular flanged edge of the outer sheet metal member 36 to provide a recess 46 in the lower corner of the inner face of the oven door as more clearly shown in Fig. 5.

This recess 46 receives a projecting arm 48 extending through a slot in the adjacent portion of the door jamb portion of the outer shell 22. This projecting arm 48 is provided with an aperture which receives the hinge pin 40, when it is longitudinally moved and locked by screw 44, for pivotally connecting the door to the projecting arm 48. This provides a simple construction by which the hinge of the door is concealed, when the door is closed, and is comparatively unobjectionable when the door is open.

The hinge bracket 38 is also provided with an integral curved arm portion 50 which extends through a slot 52 in the door jamb portion of the outer shell. This curved arm 50 also extends through a slot registering with the slot 52. This second slot is formed in the front face 98 of the door catch bracket member 54, which is fastened by screws 56 to the rear of the door jamb portion of the outer shell. The projecting arm 48 is preferably welded, or otherwise secured, to one side of the bracket member 54.

The bracket member 54 is also provided with the balancing spring 58 and the cam follower mechanism 78 which cooperate with the curved arm 50 in a manner more fully described in my said copending application, to which reference is made, if necessary, for a more detailed description thereof.

When the cam roller 78 is in engagement with the cam surface 74, it holds the door in tightly closed position. For broiling purposes, however, the door is pulled slightly open so that the spring 58 holds the door with the cam surface 76 in engagement with the cam roller 78. This holds the door slightly open so that vapors formed during broiling may escape from the oven. The force of the cam roller may be adjusted by changing the effective length of the bolt 94. The arm 50 is also provided with a shoulder 96 which is adapted to engage the rear face of the connecting front portion 98 of the bracket 54 to serve as a stop for limiting the opening movement of the door. Thus, it will be seen that the hinge bracket 38 including the arm 50 serves as a support for the hinge pin 40; it strengthens the lower portion of the door; it serves as a connection to the link 70 and spring 58; it also serves as a stop for limiting the opening movement of the door; and it also provides cam surfaces which cooperate with the cam roller 78 for holding the door tightly closed or slightly open for broiling purposes.

Figure 3:
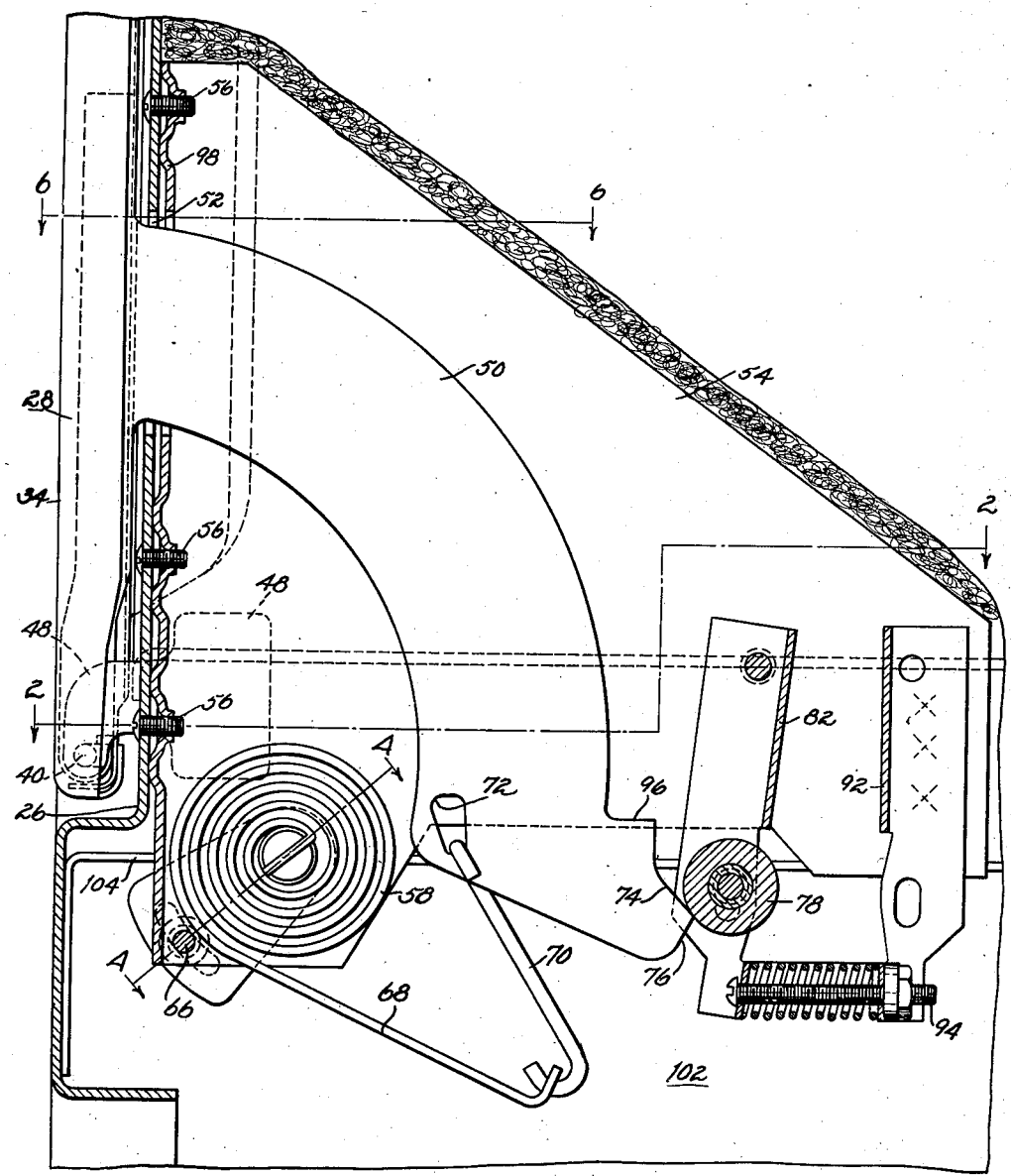
Fig. 3 is a sectional view of the unitary assembly incoporated in the range taken along the line 3—3 of Fig. 2.
Figure 4:
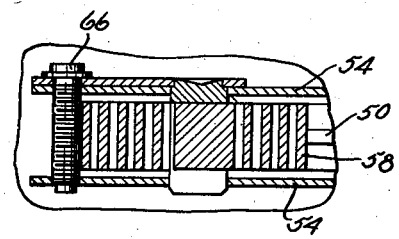
Fig. 4 is a sectional view taken along the line 4—4 of Fig. 3.

This construction provides for excellent alignment and ease of assembly. The bracket member 54, together with all its parts, is assembled prior to its installation in the oven. Thus, prior to its assembly into the oven, the bracket 54 is provided with the bracket 48, as well as the follower 82 and bracket 92, together with all their parts, as shown in Fig. 3, and also the spring 58, together with its anchoring pin, arm and screw. Before the oven liner is inserted, the hinge bracket 54 is put into its proper place from the rear of the door jamb portion 26, and fastened by the screws 56 which serves to locate the bracket 54 and all its parts, including the hinge pin bracket 48, the brackets 82 and 92, which control the cam roller and the spring 58. The door, through the bracket 48, is aligned with the bracket 54 and the door jamb portion 26 by the screws 56 which insure the location of the bracket 54. The arm 50 is located in the door with respect to the hinge pin which is aligned by the bracket 48 so that it is thereby properly aligned with the bracket 54 and, thereby, is aligned properly with the cam roller 78 and the spring 58.

After the bracket 54 is fastened in place, the oven liner is inserted and the door 28 is put into its proper place and the hinge pin 40 inserted in the bracket 48. At this time, the link 70 is connected to the arm 50 and the arm 68. This is easily done from the drawer compartment 102 provided immediately below the bottom wall 104 of the oven compartment which supports the insulation beneath the oven liner. This bottom wall 104 is notched to receive the bottom of the bracket 54. The aperture 72 is located at the level of the bottom wall 104 and is sufficiently large so that the upper end of the link 70 can readily be hooked thereon from the drawer compartment 102. The lower end of the link 70 may readily be hooked to the end of the spring arm 68 which is obviously accessible. If desired, the adjusting screw 66 may be loosened to reduce the tension of the spring 58 to facilitate the connection. This adjusting screw 66 is also readily accessible within the drawer compartment as is the screw 94. Thus service calls desiring a change in the door control may readily be taken care of. It will, therefore, be seen that by this construction of the door and door control, that all the parts may be properly aligned by simply assembling the bracket as above described. The bracket 54 is supported entirely by the three screws shown in Fig. 3.

The stove 110, shown in Figs. 7 to 18 may be substantially the same in construction as that shown and described with respect to Figs. 1 to 6, except for details of the door construction and the counterbalance construction. It may be provided with an oven door 111 which has an outer pan or panel 112 and an inner pan or panel 113. These panels 112 and 113 are telescoped and secured together. The stove is provided with hinge brackets 114 extending into the space between the panels 112 and 113 and being engaged by hinge pins 115 to support the door. The door is also provided with counterbalancing arms 116, which pass through openings 117 in the front of the stove into the space between the oven lining 118 and the outer shell 119 of the stove. The arms 116 are connected with counterbalancing springs 120 which tend to counterbalance the weight of the door as it is opened and closed.

The outer pan 112 may be substantially rectangular in shape, and may have a main face surface forming the front of the stove door. A circumferential flange 125, substantially at right angles to the main face surface, may extend substantially around the four sides of the panel 112. The circumferential flange 125 may have an inwardly directed circumferential edge or ledge 126 extending substantially at right angles to said flange 125 around the four sides of the door, with the exception, if desired, of the corners 127 and 128.

The pan or panel 113 may have a main face surface, and may be slightly offset at 129 and then continue at 130. The face surface 130 may be provided with a circumferential flange 131, substantially at right angles to the face surface 130.

The panels 112 and 113 are telescoped together by placing a lower portion 130a of the surface 130 underneath the lower portion 126a of the circumferential edge 126. The remaining flange 131 is placed in aligned abutment with the edge 126 along substantially three of the sides of the door, so that the face 130 is substantially flush with the face of the edge 126. The lower portions of the pans 112 and 113 are held spaced apart by extensions 132 formed on arms 116, hereinafter more fully described. The arms 116 are secured to the outside of the flange 131, the pan 113 being welded thereto along the rectangular end 132a of arms 116. The extensions 132 bear against the inner face of the pan 112. The upper portions of the pans 112 and 113 are held spaced apart by brackets 133 secured to the inner face of the pan 112 and provided with openings for receiving screws 134, which hold the pan 113 against the brackets 133. The panel 112 may be provided with a handle 112a. The lower face 130a of the pan 113 is slightly offset with regard to the remainder of the face 130, along the line 135. The offset is substantially equal to the thickness of the edge 126, so that the face 130 is substantially flush with the face of the edge 126a.

Figure 11:
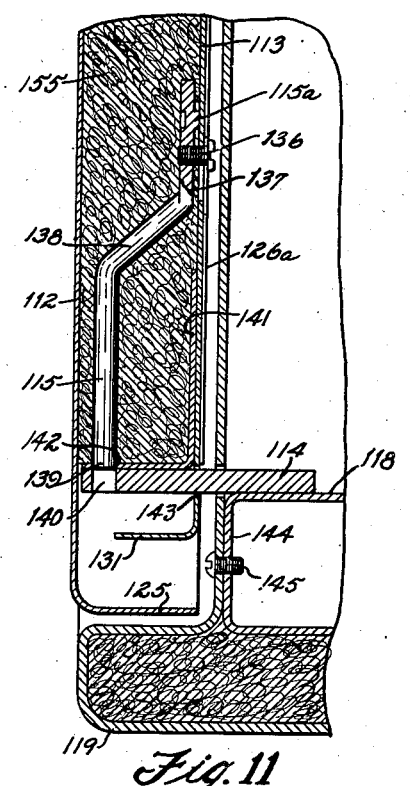
Fig. 11 is a view similar to Fig. 10; but showing a hinge pin in disengaged position.
Figure 14:
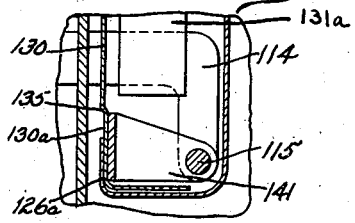
Fig. 14 is a cross-section taken along the line 14—14 of Fig. 10.
Figure 13:
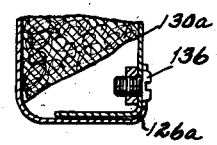
Fig. 13 is a cross-section taken along the line 13—13 of Fig. 12.
Figure 12:
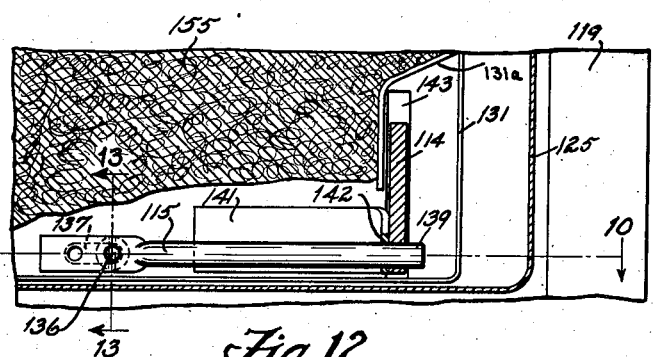
Fig. 12 is a cross-section taken along the line 12—12 of Fig. 10.
Figure 15:
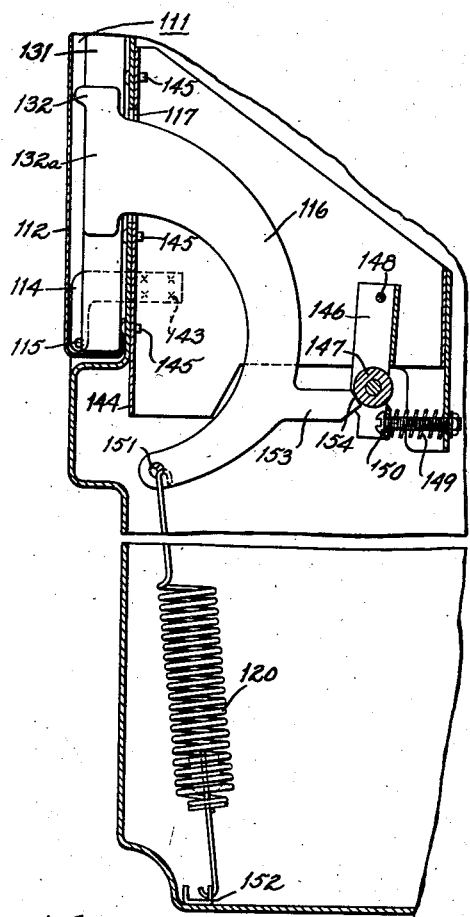
Fig. 15 is a cross-section taken through the stove showing details of a modified form of counterbalance, in its fully closed position.
Figure 16:
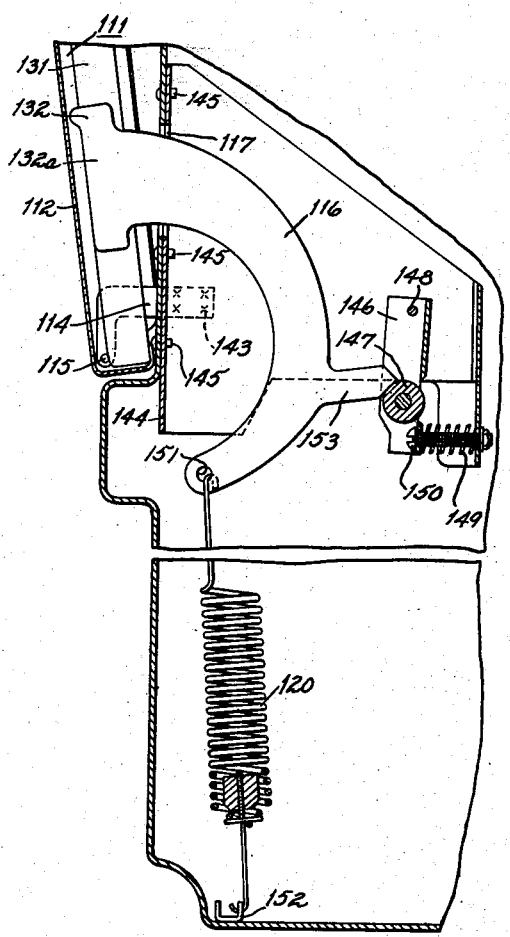
Fig. 16 is a view similar to Fig. 15; but showing the door in the slightly open, or broil, position.
Figure 17:
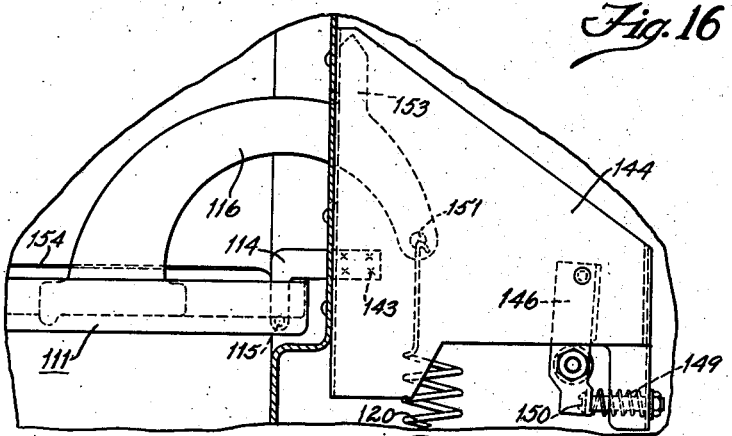
Fig. 17 is a view showing the door in its fully opened position.

Hinge pins 115 are secured to the inner face of the pan 113 by means of screws 136 which pass through slots 137, in the face 130. The heads of the screws are slightly larger than the slots 137, so that tightening of the screws frictionally engages the pins 115 against 113. A small knob 115a is provided near one end of the pins 115 which fits in the slot 137 when the pin is in engaging position and cooperates with the screw 136 to lock the pin against longitudinal movement. The knob 115a and screw 136 are spaced apart a distance equal to the length of the slot 137 for this purpose. The pins 115 are offset at 138, and the ends 139 may be caused to slide into openings 140 made in the brackets 114. A bracket 141 is welded against the inner surface of pan 113 and is provided with opening 142 to receive the end of pin 115 and hold it even when the pin is in its fully retracted position, as shown in Fig. 11. During assembly, the pin 115 is inserted into opening 142 before the screw 136 is applied, and before the two pans are telescoped. The pan 113 is provided with slots 143 through which the brackets 114 may pass into the interior of the door, so that the pins 115 may be inserted into the openings 140.

A sheet metal bracket 131a is secured to the inside of the flange 131, and bends around the opening 143. This bracket 131a holds the insulation 155 away from the opening 143, and prevents such insulation from working out of said opening.

The brackets 114 may be secured in the interior of the range substantially as disclosed with regard to Figs. 1 to 6 by welding the brackets 114 at 143 to a bracket member or box 144 made substantially the same as member 64 and secured in the oven in like manner by screws 145.

The bracket box member 144 is provided with a follower bracket 146, similar in construction and function to bracket 82, previously described. The bracket 146 is provided with a cam roller 147, and the bracket 146 is urged clockwise around the pin 148 by means of a spring 149, the limit of motion being provided by the bolt 150. Corresponding parts may be readily recognized in Figs. 1 to 6 inclusive and the action is, in general, the same.

Figure 10:
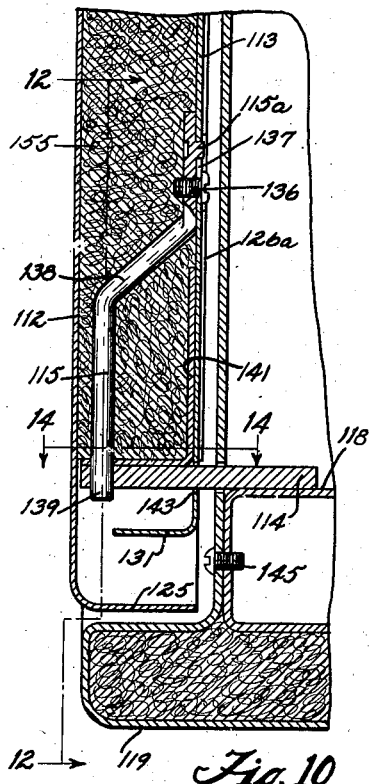
Fig. 10 is an enlarged cross-section taken along the line 10—10 of Fig. 12.

Arms 116 are welded to the outer edge of the flange 131 and, as previously described, are provided with extensions 132 to bear against the outer pan 112 to space it from pan 113. The other end of the arms 116 are provided with openings 151 to receive one end of the tension springs 120, the other end of the springs being secured in openings in cross-channel members 152 conveniently placed in the lower part of the range. The springs 120 provide the necessary counterbalance for the door. In addition, each arm 116 is provided with a somewhat radially disposed extension 153, tapered at 154. When the door is fully closed, the taper 154 is below the roller 147 as shown in Fig. 9. When the door is partly open, the taper 154 is above the roller 147, as shown in Fig. 10. In the fully open position of the door, as shown in Fig. 11, the extension 153 acts as a door stop.

Suitable insulation 155 may be placed between the panels 112 and 113 of the door. Ridges 154 may be formed in the panel 113 to reinforce the same.

While the form of embodiment of the invention as herein disclosed, constitutes a preferred form, it is to be understood that other forms might be adopted, all coming within the scope of the claims which follow.

What is claimed is as follows:

1. A door for stove ovens or the like, comprising an outer pan having a circumferential flange, an inner pan telescoped in said outer pan and having an oppositely directed circumferential flange, said last named flange being offset at a corner to form a recess between said last named flange and said first named flange, and a hinge pin secured between said pans and longitudinally slidable in said recess, and adapted to engage a supporting bracket extending from said oven.

2. A door for stove ovens or the like, comprising an outer pan having a circumferential flange, an inner pan telescoped in said outer pan and having an oppositely directed circumferential flange, said last named flange being offset at a corner to form a recess between said last named flange and said first named flange, and a hinge pin secured between said pans and longitudinally slidable into said recess, a counterbalance arm secured to the circumferential flange of said inner pan and having an integral extension along said flange to said recess and having an opening for said pin.

3. In a door, an outer pan having a circumferential flange and having two normally lower substantially rectangular corners, an inner pan telescoped in said outer pan and having an oppositely directed circumferential flange offset at its two normally lower corners to form with said first named flange two flange-surrounded recesses at the lower corners of said door, supporting brackets extending into said recesses and having pin-receiving openings therein, and slidable pins in the space between said pans extending into said recesses and into said openings to hinge said door on said brackets.

4. In a door, an outer pan having a circumferential flange and having two normally lower substantially rectangular corners, an inner pan telescoped in said outer pan and having an oppositely directed circumferential flange offset at its two normally lower corners to form with said first named flange two flange-surrounded recesses at the lower corners of said door, supporting brackets extending into said recesses and having pin-receiving openings therein, and slidable pins in the space between said pans passing through openings in the flange of said inner pan and extending into said recesses and into said openings to hinge said door on said brackets.

5. A door for stove ovens or the like, comprising an outer pan having a main face and a laterally extending circumferential flange, said main face and circumferential flange defining a pan space adjacent said main face having a thickness equal to the lateral extent of said flange and surrounded by said flange, an inner pan telescoped in said outer pan and having an oppositely directed circumferential flange, a hinge pin between said pans and confined within said first named flange, a slot in said inner pan, a screw passing through said slot and having a threaded engagement with said pin and having a head on the outer side of said inner pan, a stationary supporting bracket extending into said pan space, said hinge pin being longitudinally movable upon loosening of said screw and being adapted to engage said supporting bracket upon longitudinal movement of said pin, and means carried by said hinge pin projecting into said slot to limit longitudinal movement of said pin when said hinge pin is in engagement with said supporting bracket, said screw and projection locking said pin in place.

6. A door for stove ovens or the like, comprising an outer panel, an inner panel, a hinge pin between said panels, a slot in said inner panel, a screw passing through said slot and having a threaded engagement with said pin and having a head on the outer side of said inner panel, a stationary supporting bracket extending into the space between said pans, said hinge pin being longitudinally movable upon loosening of said screw and being adapted to engage said supporting bracket upon longitudinal movement of said pin, said pin including a slot engaging projection positioned in said slot only when said pin is arranged in bracket supporting position, said screw locking said pin and said slot engaging projection in place.

7. A door for stove ovens or the like, comprising an outer pan having a circumferential flange in a plane extending transversely of the main body of said pan, an inner pan telescoped in said outer pan and having a flange oppositely directed to said first named circumferential flange and substantially parallel to said first named flange, and an arm having one portion sandwiched between said flanges and secured to the outer surface of the circumferential flange of said inner pan and having another portion adapted to be connected to a counterbalance.

FRANCIS H. McCORMICK.